May 9, 1961   S. E. WELLS ET AL   2,983,373
METHOD FOR COOLING EXTRUSION PRESS MANDREL
Filed Dec. 10, 1958
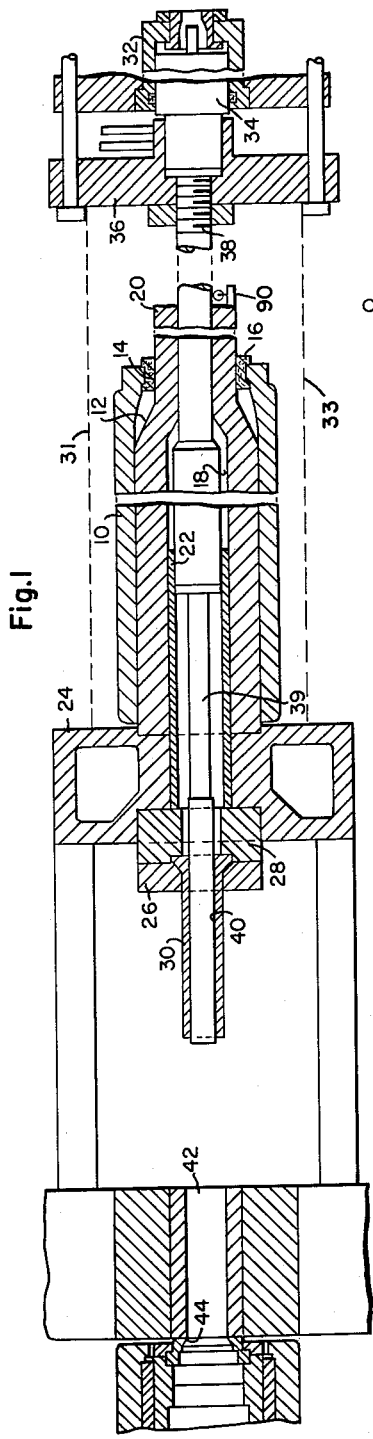
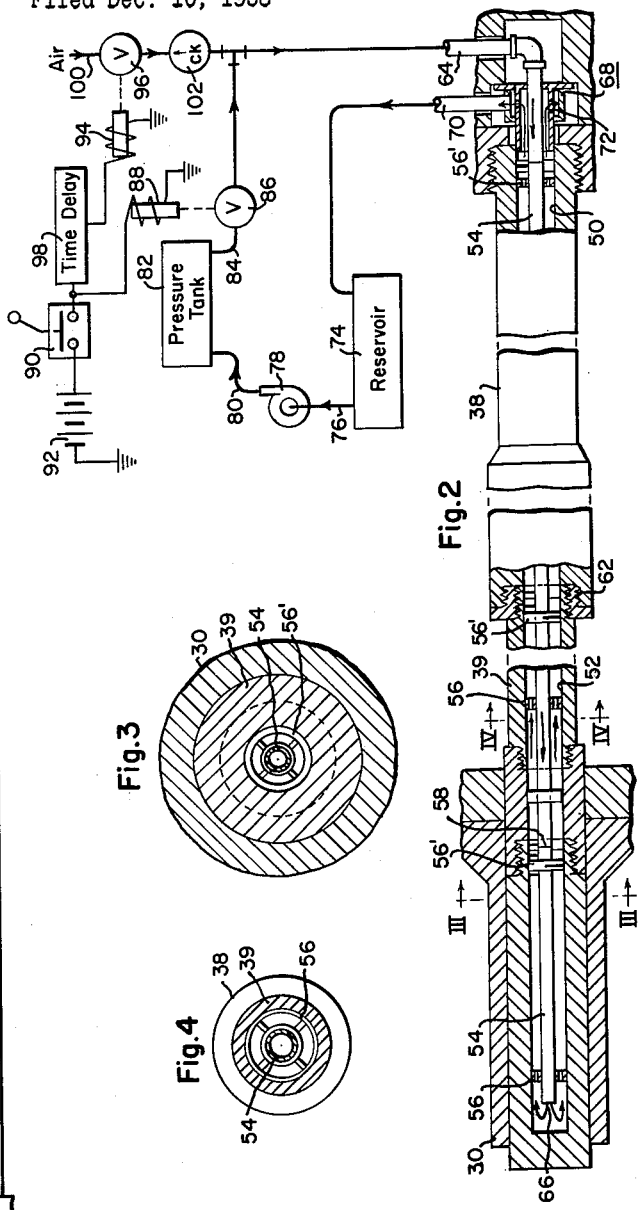
INVENTORS
Sheldon E. Wells &
William W. Bartley
BY *[signature]*
ATTORNEY United States Patent Office 2,983,373
Patented May 9, 1961

2,983,373

METHOD FOR COOLING EXTRUSION PRESS MANDREL

Sheldon E. Wells, Youngstown, Ohio, and William W. Bartley, New Castle, Pa., assignors to Lombard Corporation, Youngstown, Ohio, a corporation of Ohio Filed Dec. 10, 1958, Ser. No. 779,377

2 Claims. (Cl. 207—16)

This invention relates to a method for cooling the piercing mandrel of an extrusion press, and more particularly to a method of the type described which minimizes the danger of an explosion in the event of mandrel rupture.

In extrusion presses adapted to form tubing and the like, the billet or stock is placed in a circular container having a die at one end, and tubing is extruded through this die around a mandrel which extends through the center of the billet and into the aperture formed by the die. As is well known, the mandrel is telescopically mounted within a hollow extrusion stem, the latter being forced into the end of the container opposite the die to extrude the billet. In the extrusion process the mandrel is heated to relatively high temperatures, and in some cases may fracture when placed under stress. Consequently, it becomes necessary to internally cool the mandrel during the extrusion process or to allow the mandrel to cool in the air between successive extrusion cycles. If the latter procedure is employed, a relatively long period of time is required to reduce the temperature of the mandrel. This time may be reduced by slipping a cooling element over the free end of the mandrel, but in any event considerable time is required between successive extrusions, thereby materially decreasing the rate of production of the press. The time required to cool the mandrel may be materially decreased, and the production rate of the press increased, by internally cooling the mandrel. If, however, the mandrel is internally cooled by a liquid coolant and should it rupture during the time that it extends through the billet, the coolant within the mandrel will escape and cause an explosion upon coming into contact with the hot metal. That is, the liquid will volatilize when it contacts the hot billet, thus creating an excessive rapidly generated local pressure exceeding the strength of the billet container assembly surrounding the local pressure.

The present invention has as its primary object the provision of a method for internally cooling an extrusion press mandrel to obtain optimum cooling efficiency while eliminating the danger of explosion due to mandrel rupture. As will become apparent from the following detailed description, this object is effected by circulating cooling fluid through passages in the interior of the mandrel only during the portion of the extrusion press cycle when there is very little danger of mandrel rupture, and purging the system during the remainder of the cycle when the possibility of rupture exists, thereby eliminating the danger of explosion.

The above and other objects and features of the invention will become apparent from the following detailed description taken in connection with the accompanying drawings which form a part of this specification and in which:

Figure 1 is a fragmentary sectional view of portions of an extrusion press adapted to produce tubing, showing the relationship of the mandrel to the other parts of the press;

Fig. 2 is a sectional view of the mandrel itself together with a schematic diagram of the apparatus for purging the mandrel during portions of the extrusion press cycle;

Fig. 3 is a sectional view taken along the line III—III of Fig. 2; and

Fig. 4 is a sectional view taken along line IV—IV of Fig. 2.

Referring to Fig. 1, the extrusion press shown includes a main power cylinder 10 in which is mounted a piston 12 for reciprocating movement. The right end of the cylinder 10 is provided with an aperture 14 which receives a circular bushing or sealing member 16. The piston 12 has an axially extending bore 18 therein, said piston being provided at its right end, as viewed in Fig. 1, with an elongated sleeve-like extension 20. This extension is secured to the main piston and extends out of the cylinder 10 through the bushing 16, the arrangement being such that the piston 12 and extension 20 can reciprocate as a unit with the extension sliding on the inner periphery of bushing 16.

Extending into the left end of the bore 18 is a tubular member 22 which carries at its left end a large heavy cross-head 24. Auxiliary cylinders for assisting the forward motion of the piston 12 may be connected to cross-head 24 together with pullback cylinders which serve to retract piston 12 after it has moved to the left; however, these cylinders are not shown herein for purposes of simplicity. Bolted or otherwise securely fastened to the face of cross-head 24 are a pair of mounting blocks 26 and 28 which serve to clamp one end of an extrusion stem 30.

Rearwardly of the main cylinder 10 is a mandrel or piercer cylinder 32 having a piston 34 reciprocable therein. Connected to the left end of piston 34, substantially as shown, is a second cross-head 36 and a piercer ram 38 which extends through the tubular extension 20 into the bore 18 of piston 12. Threaded into the left end of ram 38 is a mandrel 39 which extends through a central bore 40 provided in the extension stem 30.

To the left of stem 30 is a billet container 42 having a die 44 positioned at the left end thereof. In the operation of the press, a billet is first placed in the container 42. Thereafter, the cylinder 10 is pressurized to move piston 12, cross-head 24 and stem 30 to the left. Drag rods, schematically illustrated at 31 and 33 as mechanical linkages, connect cross-head 24 to cross-head 36 so that when piston 12 moves to the left the ram 38, cross-head 36 and piston 34 will all be forced to move to the left along with piston 12. When cylinder 32 is pressurized, however, piston 34, ram 38, and mandrel 39 will move to the left independently of piston 12, thereby causing the mandrel to extend out from the bore 40. When the entire assembly of pistons 12 and 34, ram 38, stem 30 and mandrel 39 move to the left upon cylinder 10 being pressurized, the left end of stem 30 will first strike the end of a billet positioned within container 42. Thereafter, cylinder 32 is pressurized to force the mandrel 39 through the center of the billet and into the aperture of the die 44. Now, when the stem 30 moves further to the left, a tube will be extruded between the peripheries of the die and the mandrel in a well known manner.

The billet, of course, is heated prior to the extrusion process; and, consequently, the mandrel 39 becomes hot during the extrusion process. The present invention provides a means for efficiently cooling the mandrel to minimize the possibility of its rupturing due to overheating.

Referring to Fig. 2 for a more detailed showing of the invention, it can be seen that the ram 38 and mandrel 39 have bores 50 and 52, respectively, extending therethrough. As shown, the mandrel and the ram are made up of a series of tubular sections, each of which is threaded into the next successive section. Extending through the bores 50 and 52 is a tube 54, also made up in sections with each section being bayoneted into the next successive section. It will be seen that each of the sections of tube 54 has one or more spiders 56 spaced along its axis and encircling its outer periphery. One of these spiders 56' at the end of each tubular section is provided with threads which screw into mating threads on the inner periphery of the right end of each section of ram 38 and mandrel 39. Thus, in constructing the assembly, the spider 56' on the end of each section of tube 54 is threaded into its corresponding section of ram 38 or mandrel 39. Thereafter, the sections of the mandrel and the ram are threaded together with the sections of tube 54 bayoneting together as at 58, and finally the completed mandrel is threaded into ram 38 at 62.

The right end of the section of tube 54, within ram 38 is connected to a pipe 64. Fluid entering pipe 64 will follow the path of the arrows, flowing through tube 54 to its extreme left end at 66 and thence through bores 52 and 50 to a rotary pipe joint 68 where it flows into a return pipe 70. By virtue of the rotary pipe joint 68 allowing the sleeve 72 to rotate independently of the pipe 70, the ram 38 and mandrel 39 may be indexed to any angular position without affecting the mandrel cooling system. During rotation of the mandrel, the tube 54 may, of course, remain stationary.

The pipe 70 leads to a reservoir 74 which, in turn, is connected through pipe 76 to the inlet port of a pump 78. The outlet port of pump 78 is connected through pipe 80 to a high pressure tank 82 having a connection through pipe 84 to the inlet port of a normally open valve 86. As shown, valve 86 will normally connect pressure tank 82 to pipe 64. When, however, solenoid 88 is energized from voltage source 92 upon closure of limit switch 90, the high pressure supplied to pipe 64 will be cut off. When limit switch 90 thus closes it also connects voltage source 92 to a second solenoid 94 which opens normally closed valve 96 for a period of time determined by time delay device 98, thereby connecting air under pressure in pipe 100 to pipe 64 through check valve 102.

The limit switch 90 is set to close by movement of mandrel 39 when the mandrel first begins the piercing operation. Thus, when the mandrel does not extend into the billet and there is little danger of rupture, valve 86 will connect pipe 64 to pressure tank 82 whereby a cooling liquid is forced through tube 54, bores 52 and 50, and pipe 70 to the reservoir 74. When, however, the mandrel extends into the billet, limit switch 90 will close, thereby energizing solenoids 88 and 94. As shown in Fig. 1, limit switch 90 is connected to the end of extension 20 on piston 12 and is arranged to engage a detent in the ram 38. Thus, forward movement of the ram 38 and mandrel 39 relative to piston 12 at the beginning of a piercing operation will close the limit switch. This action closes valve 86 and opens valve 96 whereby compressed air is forced into the system to purge the same of any liquid during the time that the danger exists of a mandrel rupture and consequent explosion.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. The method of cooling an extrusion press mandrel having axially extending passages therein for conducting a cooling fluid therethrough, which comprises the steps of forcing a cooling liquid through said passages during the time when the mandrel is retracted so that billet metal will not flow therearound which is the portion of an extrusion cycle when the possibility of mandrel rupture is slight, and purging said passages with a gas during the time when the mandrel is in tube-extruding position which is the portion of said cycle when the possibility of mandrel rupture exists.

2. The method of cooling an extrusion press billet-piercing mandrel having axially extending passages therein for conducting a cooling fluid therethrough, which comprises the steps of forcing a cooling liquid through said passages during the time when the mandrel is retracted so that billet metal will not flow therearound which is the portion of an extrusion cycle when the mandrel is external to the interior of a billet, and purging said passages with a gas during the time when the mandrel is in tube-extruding position which is the portion of said cycle when the mandrel extends through said billet to thereby eliminate the possibility of explosion during the time that the mandrel is within the billet.

References Cited in the file of this patent

UNITED STATES PATENTS

| | | |
|---|---|---|
| 1,533,191 | Kaiser et al. | Apr. 14, 1925 |
| 1,964,600 | Royle | June 26, 1934 |
| 2,161,570 | Harris | June 6, 1939 |
| 2,161,847 | Blodgett | June 13, 1939 |
| 2,632,207 | Mahla | Mar. 24, 1953 |
| 2,658,687 | Southworth | Nov. 10, 1953 |
| 2,713,941 | Schuler | July 26, 1955 |
| 2,732,066 | Albers | Jan. 24, 1956 |
| 2,863,557 | Munker | Dec. 9, 1958 |
| 2,865,502 | Anscher | Dec. 23, 1958 |
| 2,866,545 | Honkala et al. | Dec. 30, 1958 |

FOREIGN PATENTS

| | | |
|---|---|---|
| 1,106,932 | France | July 27, 1955 |
| 778,991 | Great Britain | July 17, 1957 |